United States Patent [19]
Svetal et al.

[11] Patent Number: 6,112,993
[45] Date of Patent: Sep. 5, 2000

[54] FLEXIBLE DITHER MOUNT WITH ROTATION

[75] Inventors: Michael P. Svetal, Eugene, Oreg.; Brian McMaster, Pittsford, N.Y.

[73] Assignee: PSC Scanning, Inc., Eugene, Oreg.

[21] Appl. No.: 09/146,396

[22] Filed: Sep. 3, 1998

[51] Int. Cl.[7] .................................................. G06K 7/10
[52] U.S. Cl. ........................ 235/462.38; 235/472.01
[58] Field of Search ............................. 235/467, 472.01, 235/462.38

[56] References Cited

U.S. PATENT DOCUMENTS 5,475,206  12/1995  Reddersen et al. .
5,629,510   5/1997  Quinn et al. .

OTHER PUBLICATIONS

Colley et al., U.S. application Ser. No. 08/394,487, "Dithering Assemblies for Barcode Scanners," filed Sep. 19, 1997.

Primary Examiner—Harold I. Pitts
Attorney, Agent, or Firm—Lyon & Lyon LLP

[57] ABSTRACT

A scanning system and method of data reading in which the scanning system is provided with a mounting mechanism having the ability to flex and/or rotate when subjected to external mechanical shock for reducing shock experienced by the more delicate scanning components.

18 Claims, 3 Drawing Sheets

6,112,993

FLEXIBLE DITHER MOUNT WITH ROTATION

BACKGROUND

The field of the present invention relates to optical systems for data reading and particularly to a scanning system having improved resistance to shock and vibration.

Typically a data reading device such as a bar code scanner illuminates a bar code and senses light reflected from the code to detect the bars and spaces of the code symbols and thereby derive the encoded data. In a common system, an optical beam of light, such as a laser beam produced by a laser diode is scanned over a scan angle so as to scan the laser spot across the item being read. A variety of mechanical scanning mechanisms are known as described in for example U.S. Pat. Nos. 5,475,206 and 5,629,510 or U.S. application Ser. No. 08/934,487, each of these disclosures hereby incorporated by reference, such scanning mechanisms comprising a rotating polygon mirror, dithering or oscillating mirror, scanning light source or laser diode, rotating/oscillating prisms, holographic elements and others devices. Essentially all these scanners include a supporting structure which allows for movement of the mechanical scanning mechanism.

Current mechanical scanning mechanisms are relatively sensitive to shock. Handheld scanners are particularly subjected to shock and have been equipped with shock protection such as by containing the scanning mechanism within a scan module and mounting the scan module within a housing via shock mounts as described in U.S. Pat. No. 5,475, 206, incorporated by reference. Nonetheless because of this sensitivity to shock and the use of these devices in hand-held applications, these scanners and scan engines are often damaged before they would have worn out for other reasons.

SUMMARY OF THE INVENTION

The present invention is directed to a scan module and scanning assemblies therefore including a mounting mechanism for provided with ability to flex and/or rotate when subjected to external mechanical shock for reducing shock experienced by the more delicate scanning components.

DETAILED DESCRIPTION OF PREFERRED EMBODIMENTS

Preferred embodiments will now be described with reference to the drawings. For clarity of description, any element numeral in one figure will represent the same element if used in any other figure.

Figure 1:
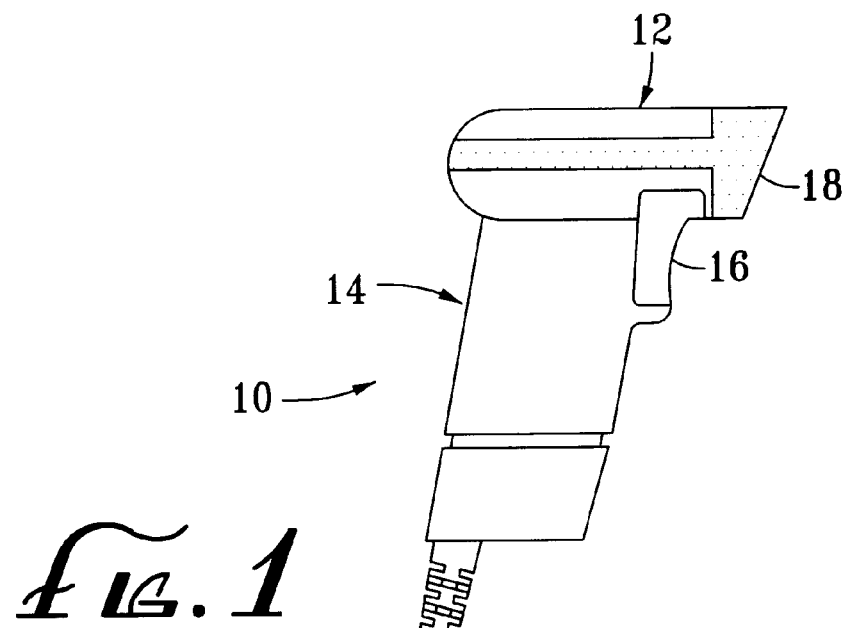
FIG. 1 is a side view of a handheld scanner as may be utilized by the present invention.
Figure 2:
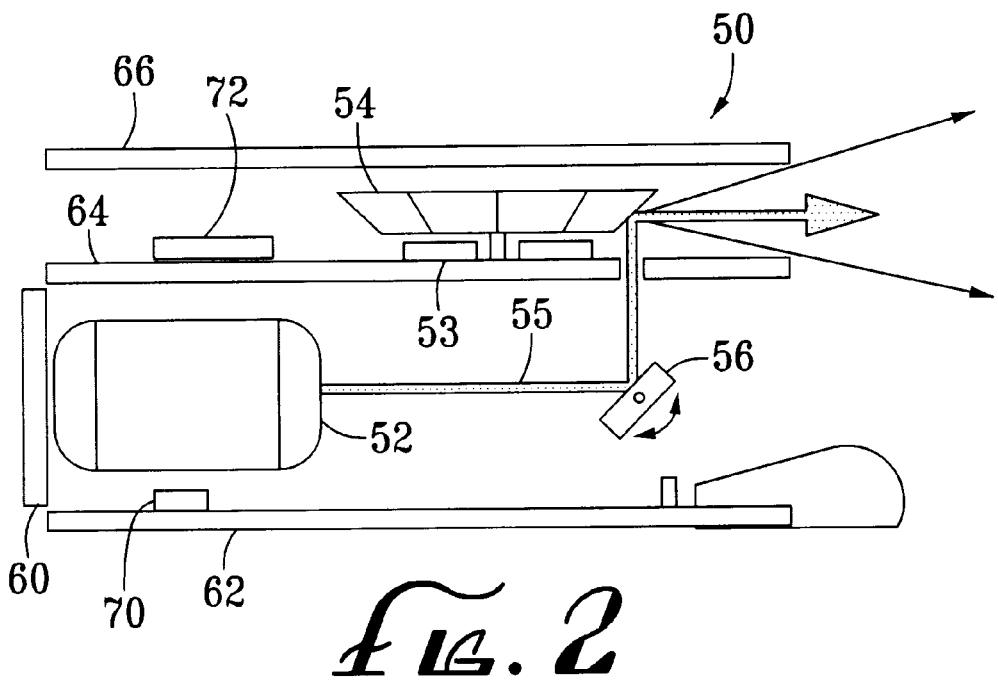
FIG. 2 is a diagrammatic side view of an example scan module.

FIGS. 1–2 illustrate an example of a bar code reader 10 configured as a handheld gun-shaped device constructed of a lightweight plastic housing having a head portion 12 and pistol-grip type handle portion 14. The head portion 12 contains a removable scan module which contains a light source, a detector, the optics and signal processing circuitry. The scanner 10 may be attached to a host 5 via a cable 20, connected or incorporated into a portable data terminal, or may be cordless, powered by an internal battery, communicating with the host via wireless link or storing data in memory for periodic download, such as when integrated in a portable data terminal. A light-transmissive window 18 in the front end of the scan head portion 12 permits outgoing light beam 55 to exit and the incoming reflected light to enter. The user aims the reader 10 at a bar code symbol and actuates a trigger 16 on the handle portion 14 to activate the light source and scanning mechanism to scan the beam across the symbol.

The scan assembly 50 may include one or more scan mechanisms, for example as shown in FIG. 2, a first dithering mirror assembly 56 and a second dithering mirror assembly 54. The scan assembly 50 typically may include a light source, such as a laser diode 52 producing a light beam 55 which is scanned by one or more mirror assemblies 54, 56 and then exits the window 18. The components may be mounted to a suitable chassis and contained within an enclosure the sides of which may be part of the chassis or integrated into printed circuit boards 60, 62, 66. According to a first embodiment, a specialized mounting mechanism for movable mounting the dither mount for shock protection, may be provided on one or both of the scan mechanism 54, 56.

Though the following examples are illustrated as applied to mounting mechanisms on dithering mirror assemblies, such mechanism may be applied to locking down other mechanical scan mechanisms. For example, the scan mechanism may comprise pivoting/oscillating light source or laser diode, a dithering or oscillating scanning mechanism disposed in the path of the optical beam such as a dithering mirror, dithering/oscillating prisms, holographic elements and others devices—essentially any supporting structure which allows for movement of a dithering/oscillating scanning mechanism.

Figure 3:
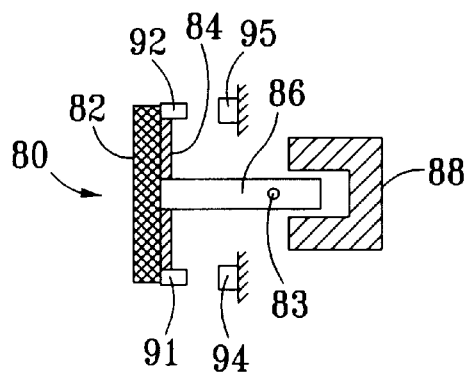
FIG. 3 is a top view of a dither scanning mechanism according to a first embodiment of the present invention.
Figure 4:
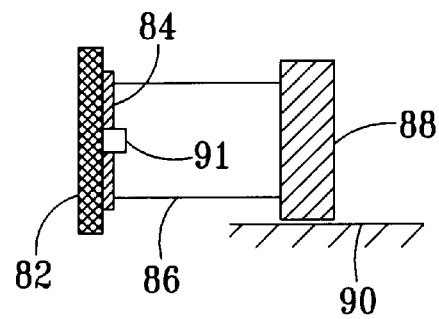
FIG. 4 is a side view of the dither scanning mechanism of FIG. 3.
Figure 5:
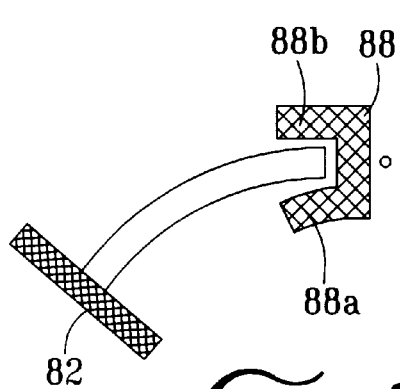
FIG. 5 is a top view of a scanning mechanism of FIG. 3 employing a flexible mount mechanism according to a first embodiment of the present invention.

FIGS. 3–5 illustrate a first embodiment comprising a dithering mirror assembly 80. The assembly 80 includes a mirror 82 mounted on a mirror bracket 84, the mirror assembly 80 is supported on a flexure 86 so as to pivot about pivot point 83. The flexure 86 has a free or movable end attached to the mirror bracket 84 assembly and a support or fixed end attached to mount 88. The mirror assembly 80 is driven by a magnetic drive on one or both sides of the mirror 82. In a first example, permanent magnets 91, 92 are disposed on one or opposite sides of the mirror 82 which are driven by magnet coils 94, 95 as controlled by a suitable controller.

The mount 88 is mounted to the chassis 90 so as to be flexible and/or rotatable such that when subjected to external mechanical shock, the flex experienced by the flexure 86 due to shock accelerations is reduced or minimized. Thus the mount 88 becomes a flexible and/or rotatable joint for mounting of the flexure 86. This feature is particularly useful at the high shock condition because the highest stress on the flexure 86 occurs at the mounting point (i.e. at the mount arms 88a & 88b). By allowing flexibility of the mount arms 88a, 88b and/or rotation of the mount 88, the flexing of the flexure 86 right at the mounting point to the mount arms 88a, 88b is softened thereby reducing stresses at the highest bending stress location.

In a first example as shown in FIG. 5, the arms 88a, 88b of the mount 88 are constructed from a flexible material such that when subjected to mechanical shock, the arms 88a, 88b which support the fixed end of the flexure 86 will flex from the position illustrated in FIG. 3 to the position illustrated in FIG. 5 thereby reducing the flex experienced by the flexure 86 due to mechanical shock.

Figure 6:
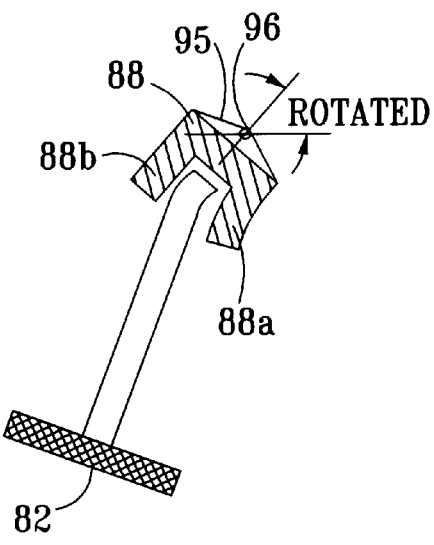
FIG. 6 is a top view of a scanning mechanism of FIG. 3 or 4 employing a rotatable mount mechanism according to a second embodiment of the present invention.

In a second example as shown in FIG. 6, the mount 88 is mounted on a bracket 95 which may rotate somewhat about pivot 96 such that when subjected to external mechanical shock, the mount 88 will pivot from the position illustrated in FIG. 3 to the position illustrated in FIG. 6 thereby reducing the flexing/stress of the flexure 86 due to mechanical shock.

FIG. 6 also illustrates that the rotating mount 95 may be combined with the flexible mount arms 88a, 88b. When combined with the flexible/rotatable mount 88, overflexing of the flexure when subjected to external mechanical shock is reduced or minimized.

Figure 7:
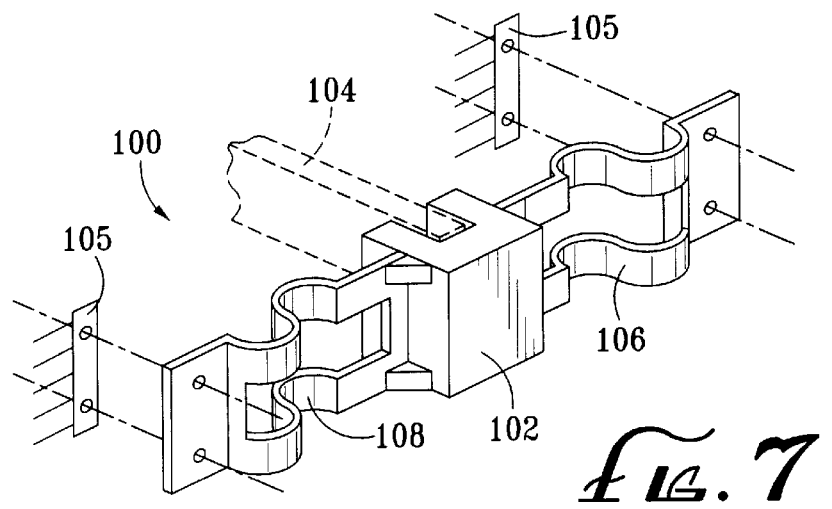
FIG. 7 is a detailed perspective view of an alternate mount mechanism for the flexure mount.

FIG. 7 illustrates an alternate mounting system 100 for a flexure mount 102. In this embodiment, the flexure mount 102 to which the flexure 104 is mounted, is itself flexibly mounted via flexures 106, 108 to the base 105. The flexures 106, 108 may be constructed of sheet metal, rubber or plastic or combinations thereof. The mount 102 and flexures 106, 108 may comprise separate components of the same or different materials. Alternately, the mount 102 and flexures 106, 108 may be constructed as a unitary element such as a single piece molded component of suitable thermoset plastic or rubber.

Additional shock protection may be included such as the shock mounts. For example, the scan assembly module 50 is positioned within the scan head 12 and may be mounted to sides of the scan head 12 by shock mounts as described in U.S. Pat. No. 5,475,206 hereby incorporated by reference to provide enhanced shock protection. The individual printed circuit boards and/or chassis elements 60, 62, 64, 66 may be provided with additional separate shock mounting features. In addition, the dither mechanism may include dither parking mechanisms disclosed in U.S. Ser. No. 09/119,253 also hereby incorporated by reference.

The flexure 86 may be constructed from metal such as beryllium copper alloy, or plastic such as Mylar™ or combinations thereof. The dither mount arms 88a, 88b may also be constructed from metal, plastic, rubber or other flexible material. The dither mount 88 may be constructed in a single molded component or alternately constructed as an assembly or combination of parts. The mount 88 is designed to be of stiffer construction that the flexure 86 so as to flex significantly only when subjected to higher shock forces.

Figure 8:
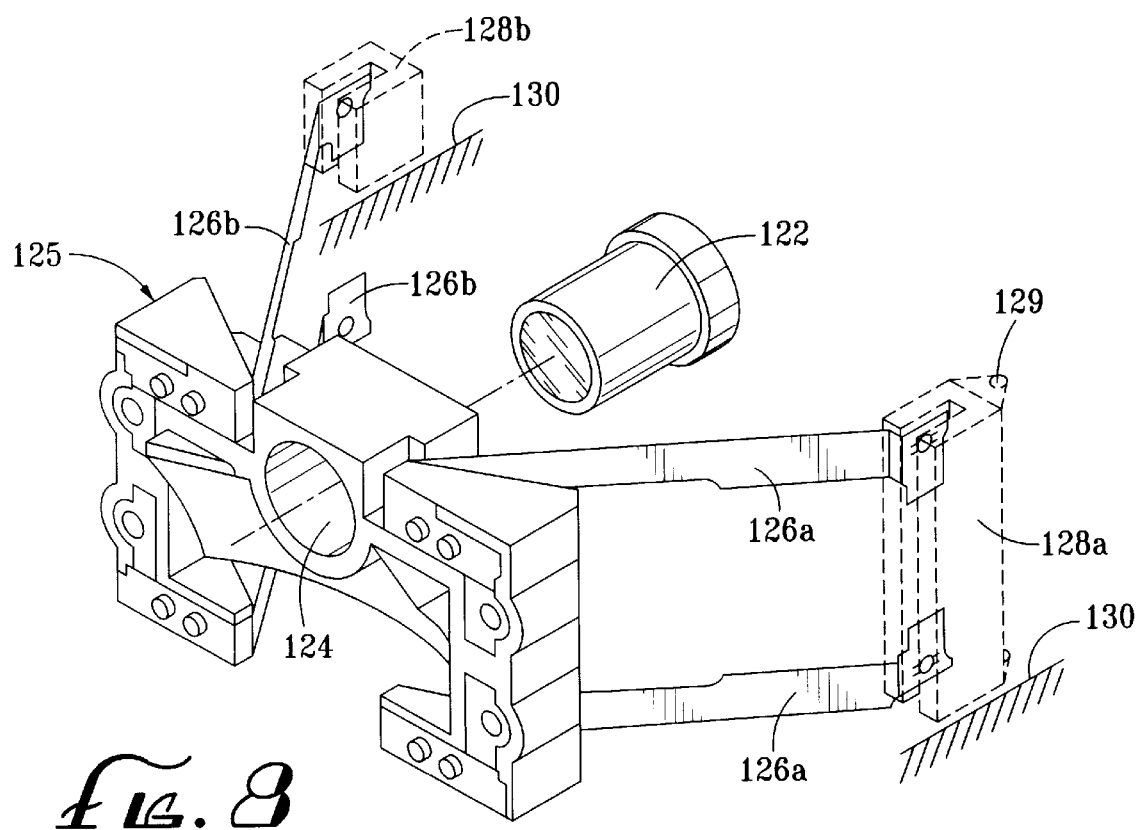
FIG. 8 is a perspective view of a rotatably/flexibly mounted scan mechanism comprising a scanning light source.

The system may also be employed various flexure configurations such as for example dithering light source flexure configuration of U.S. Pat. No. 5,629,510. FIG. 8 illustrates one system 120 in which the scan mechanism comprises a laser diode light source 122 mounted within a socket 124 of a frame element 125. The frame 125 is mounted on flexures 126a, 126b allowing the frame 125 to pivot thereby providing the scanning motion for the light beam generated by the laser diode 122. The flexures 126a, 126b may comprise separate flexure elements or a unitary "V" shaped flexure supported at opposite ends by supports 128a, 128b. The supports may comprise a single support such as support 128a or separate supports such as support 128b. In this configuration, the scan element (which in this embodiment is the laser diode 122) is mounted to the free end of the flexure 126 (at the center of the "V") and the fixed end(s) of the flexure 126 are rotatably mounted to the base 130 via pivots 129 or otherwise flexibly supported to the base 130 in similar mechanisms as described in one or more of the previous embodiments.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A scanning module for reading an object, comprising:
   a base;
   a dither mount attached to the base;
   a dithering scanning component for scanning a light beam across the object;
   a flexure having a support end attached to the mount and a free end attached to the scanning component;
   drive means for oscillating the scanning component about an axis during reading;
   wherein the dither mount includes means for reducing flex experienced by the flexure when the module is subjected to mechanical shock.

2. A scanning module according to claim 1 wherein the means for reducing flex comprises flexible arm members which secure the support end of the flexure, the arm members flexing to reduce stress experienced by the flexure.

3. A scanning module according to claim 2, wherein the means for reducing flex further comprises a pivot for allowing the dither mount to rotate somewhat when subjected to external mechanical shock.

4. A scanning module according to claim 2 wherein the flexible arm members and dither mount are constructed of rubber.

5. A scanning module according to claim 1, wherein the scanning component includes a mirror assembly.

6. A scanning module according to claim 1, wherein the scanning component includes a dithering light source.

7. A scanning module according to claim 1, wherein the means for reducing flex comprises a mounting bracket pivotally mounted to the base.

8. A scanning module according to claim 1, wherein the flexure comprises a spring, and wherein the spring lies in a plane generally perpendicular to the mirror in an unflexed condition of the spring.

9. A scanning module according to claim 1, wherein the means for reducing flex comprises a pivot for allowing the dither mount to rotate somewhat when subjected to external mechanical shock.

10. A scanning module according to claim 1, wherein the scanning mechanism comprises a magnetically driven dithering mirror.

11. A scanning system for data reading comprising:
    a light source generating a reading beam;
    a base;
    a dither mount mounted to the base;
    a flexure having a support end attached to the mount and a free end;
    a scan mirror mounted to the free end of the flexure, wherein the scan mirror is pivotally mounted to the dither mount via the flexure;

wherein the dither mount includes flexible arm members for flexibly supporting the support end of the flexure for reducing stress experienced by the flexure when subjected to mechanical shock.

12. A scanning system for data reading according to claim 11 wherein the dither mount is pivotally mounted to the base.

13. A scanning system for data reading according to claim 11 wherein the dither mount is constructed of rubber.

14. A scanning system according to claim 11 comprising a portable handheld scanning unit.

15. A scanning system for data reading comprising:

a light source generating a reading beam;

a base;

a dither mount mounted to the base;

a flexure having a support end attached to the mount and a free end;

a scan mirror mounted to the free end of the flexure, wherein the scan mirror is pivotally mounted to the dither mount via the flexure;

wherein the dither mount is flexibly mounted to the base for reducing stress experienced by the flexure when subjected to mechanical shock.

16. A scanning system for data reading according to claim 15 wherein the dither mount is flexible mounted to the base by means of a pivoting connection.

17. A scanning system for data reading according to claim 15 wherein the dither mount is flexibly mounted to the base via flexures.

18. A method of providing mechanical shock protection for a flexure of scan mechanism of a handheld data reader, comprising the steps of mounting a scan element to one end of the flexure;

attaching a second end of the flexure to a mount;

rotatably mounting the mount to a base element.

* * * * *